United States Patent [19]

Bruzzese et al.

[11] 3,963,732

[45] June 15, 1976

[54] PROCESS FOR PREPARING DIHYDROXYDIPHENYLMETHANE DERIVATIVES

[76] Inventors: Tiberio Bruzzese, 8, Via Biella, 20143 Milan; Rodolfo Ferrari, 7, Via Monte Cervino, 20149 Milan, both of Italy

[22] Filed: Aug. 21, 1974

[21] Appl. No.: 499,433

Related U.S. Application Data

[62] Division of Ser. No. 375,477, July 2, 1973, Pat. No. 3,878,218.

[30] Foreign Application Priority Data

May 30, 1973 United Kingdom............... 25633/73

[52] U.S. Cl.................. 260/294.8 R; 260/293.69; 260/295 R; 260/297 R; 424/263; 424/267
[51] Int. Cl.²............... C07D 213/30; C07D 213/32
[58] Field of Search............................ 260/294.8 R

[56] References Cited
UNITED STATES PATENTS

| | | | |
|---|---|---|---|
| 3,558,643 | 1/1971 | Pala | 260/294.8 R |
| 3,873,551 | 3/1975 | Bruzzese et al. | 260/294.8 R |

FOREIGN PATENTS OR APPLICATIONS

| | | | |
|---|---|---|---|
| 879,247 | 10/1961 | United Kingdom | 260/295 R |
| 1,241,782 | 8/1971 | United Kingdom | 260/294.8 R |

*Primary Examiner*—Henry R. Jiles
*Assistant Examiner*—Robert T. Bond
*Attorney, Agent, or Firm*—Wenderoth, Lind & Ponack

[57] ABSTRACT

There is provided a new process for the preparation of esters of 4,4'-dihydroxydiphenyl-(2-pyridyl)-methane of the general formula:

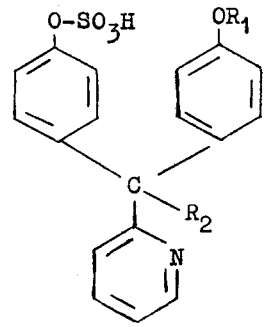

which
wherein $R_1$ is a hydrogen atom or a sulpho group or an acyl radical and $R_2$ is a hydrogen atom or a carboalkoxy radical, and the salts thereof with pharmaceutically-acceptable, non-toxic inorganic and organic bases. Those compounds in wich $R_2$ is a carboalkoxy radical are new.

6 Claims, No Drawings

PROCESS FOR PREPARING DIHYDROXYDIPHENYLMETHANE DERIVATIVES

This is a division of application Ser. No. 375,477 filed July 2, 1973 now U.S. Pat. No. 3,878,218.

BACKGROUND OF THE INVENTION

The need for effecient laxative compounds is well known but many of the laxative compositions at present available suffer from numerous disadvantages, such as producing an irritating effect, especially in the colonic and rectal regions of the intestinal tract, and of having a comparatively low solubility, which renders administration more difficult and frequently necessitates particular forms of formulation of the known laxative compounds. Furthermore, many of the known laxative compounds have an insufficient stability at the pH values prevailing in the gastrointestinal tract, which reduces their efficacy.

Consequently, there is a need for new laxative compounds which do not suffer from the disadvantages of the previously known and used laxative compounds and, accordingly, it is an object of the present invention to provide such new laxative compounds.

A further object of the present invention is to provide a new and improved process for the preparation of laxative compounds.

Another object of the present invention is to provide pharmaceutical compositions containing the laxative compounds of the present invention.

SUMMARY OF THE INVENTION

According to the present invention, there is provided a process for the preparation of compounds of the general formula:-

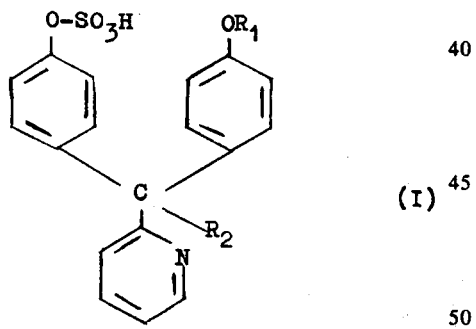

(I)

wherein $R_1$ is a sulpho group ($SO_3H$) or an acyl radical or a hydrogen atom and $R_2$ is a carboalkoxy radical (COO-alkyl) or a hydrogen atom; and the salts thereof with pharmaceutically acceptable, non-toxic inorganic and organic bases.

DETAILED DESCRIPTION OF THE INVENTION

The acyl radical $R_1$ in the above-given general formula (I) preferably contains up to 6 carbon atoms and can be derived, for example, from acetic acid, propionic acid, butyric acid, valeric acid or caproic acid or the branched chain isomers thereof. The carbalkoxy radical $R_2$ in the above-given general formula preferably contains up to 6 carbon atoms in the alkyl group and is preferably a carbomethoxy or carboethoxy radical.

Examples of salts of the compounds of general formula (I) include the alkali metal (sodium, potassium and the like), alkaline earth metal (calcium, magnesium and the like), aluminium salts, as well as salts with non-toxic organic bases, such as mono-, di- and trialkylamines, mono-, di- and trialkanolamines and heterocyclic amines, for example, methylamine, diethylamine and piperidine.

The compounds (I) possess interesting therapeutic laxative properties.

Although some of the above-mentioned compounds (I) are already known from the literature (I, $R_2 = H$), the process of the present invention can be used to prepare the compounds (I) by a new and original route, including the preparation of new intermediates which are very active in the same pharmacological field, the new process being simple to carry out and giving good yields of pure products. In addition, the new process eliminates certain disadvantages of the known processes and thus represents an improvement in the art.

The synthesis process hitherto described for preparing the above-mentioned compounds (I) comprises reacting 2-pyridinaldehyde with excess phenol in the presence of a condensation agent to give the 4,4'-dihydroxy compound of the formula:-

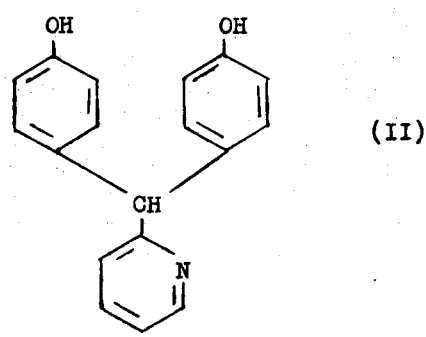

(II)

which is then mono- or di-esterified to give 4-sulphoxy derivatives or general formula (I; $R_2 = H$).

Because the phenol can also condense, during the first step of the process, in the ortho position to give large quantities of the isomeric 2,4'-dihydroxy-diphenyl (III) and 2,2'-dihydroxydiphenyl-(2-pyridyl)-methanes (IV):

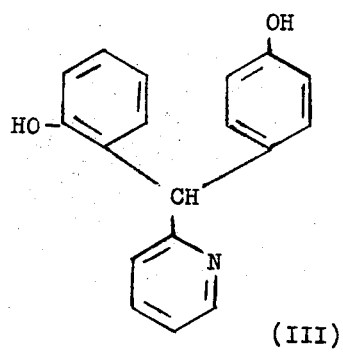

(III)

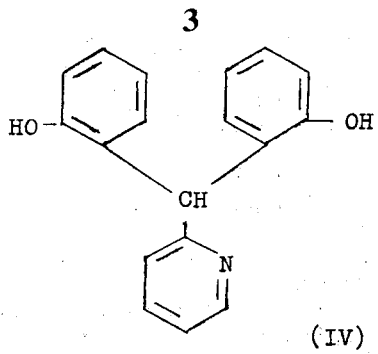

(IV)

the condensation of the 2-pyridinaldehyde can be carried out with o-halo-phenols, followed by the esterification step and finally by dehalogenation.

In addition to these technical difficulties, we have observed that another disadvantage arises from the use of 2-pyridinaldehyde. This substance is not very easy to prepare and sometimes it can only be obtained in low yields. Furthermore, as is frequent with many aldehydes, it is not stable and, even at ambient temperature, prolonged storage can produce an irreversible dimerisation, with consequent high losses of material. The same by-product is formed due to the effect of the temperature during purification by distillation.

According to the present invention, we have now found that compounds of general formula (I) can be prepared by an alternative process which eliminates a great deal of the above-mentioned disadvantages.

Thus, according to the present invention, an alkyl 2-pyridine-glyoxylate (V, $R_2$ = COO-alkyl, i.e. a carboalkoxy radical) is reacted with excess phenol in the presence of a condensation agent to give a 4,4'-dihydroxy compound (VI), according to the following equation:

If desired, the above-mentioned esters can be hydrolysed and decarboxylated to give the final compounds (I) wherein $R_2$ is a hydrogen atom.

Thus, it can be seen that an important advantage during the condensation phase to give the compounds (VI) lies in not using the very unstable 2-pyridinaldehyde: in contradistinction thereto, the esters of 2-pyridineglyoxylic acid are stable compounds which can be distilled without decomposition and are easily obtained, for example, by oxidation of the corresponding esters of 2-pyridineacetic acid, in high yields and purity.

In addition, we have found that the use of the alkyl 2-pyridine-glyoxylates, because of the low reactivity and/or because of steric hindrance due to the ester group, reduces the possibility of a reaction with the orthopositions of the phenol, thus preventing or minimising the possibility of the formation of 2,4'-dihydroxy and 2,2'-dihydroxy isomers. It is, however, obvious that the reaction can also be carried out with the o-halo-protected phenols as in the case of the reaction with 2-pyridinaldehyde reported in literature, followed by dehalogenating by hydrogenation, using metal alloys and alkalis at ambient temperature for 12 – 48 hours, in a final step following esterification.

The general conditions for the condensation reaction do not differ substantially from those of similar reactions and include, for example, the use of about 80 – 90% sulphuric acid and reaction times of 12 – 72 hours at 20 – 60°C.

The reaction which gives the desired compounds (I, $R_2$ = COO-alkyl), i.e. the esterification reaction, is one of the novel features of the new process since the 0-sulphonation and the 0-acylation of alkyl α, α-di(4-hydroxyphenyl)-2-pyridine acetates does not have a precedent in literature. The procedure of esterification with sulphonic acid can be carried out with chlorosulphonic acid or with equimolar addition compounds of

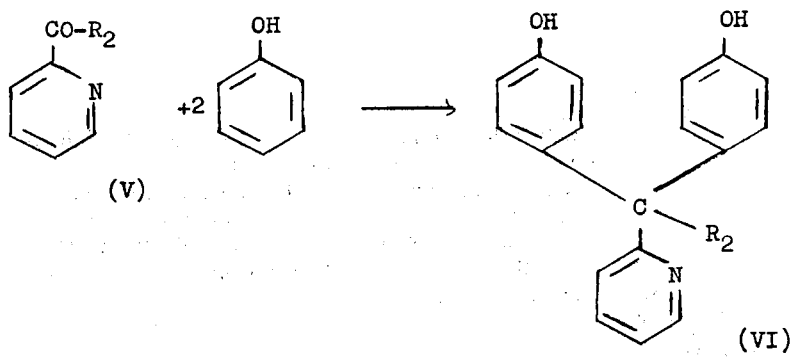

The compound (VI) is then esterified to give a corresponding 4-sulphoxy or 4'-acyloxy derivative or is diesterified to give a corresponding 4,4'-disulphoxy or 4-sulphoxy-4'-acyloxy derivative, i.e. a mixed ester, of general formula (I, $R_2$ = COO-alkyl). Obviously, the mixed esters can be obtained independently of the order of introduction of the sulpho and acyl radicals, i.e. the 4-hydroxy group is first sulphonated and the 4'-hydroxy group is then acylated or the 4'-hydroxy group is first acylated and the 4-hydroxy group then sulphonated.

sulphur trioxide and various basic organic substances, for example pyridine, triethylamine or the like or non-basic organic compounds, for example dioxan. The reaction is preferably carried out in an aprotic anhydrous organic solvent, for example pyridine. The conditions of the synthesis permit wide variations of the temperature, usually between 20° and 60°C., and of the reaction times, for example from 12 to 48 hours.

An important difference in comparsion with the abovementioned known methods of preparation of sulphuric esters, is the possibility of carrying out the reaction in an aqueous medium, with consequent economical and practical advantages.

Thus, we have found that, among the various sulphonating agents, the addition compounds of sulphur trioxide with basic substances, for example pyridine or triethylamine, are markedly resistant to hydrolysis in aqueous media and thus enable the esterification to be carried out in water buffered at moderately alkaline pH. Other reagents, such as chlorosulphonic acid or the addition compound of sulphur trioxide with dioxan, do not seem to be able to give the desired esters, even in small quantities.

Diesterification with sulphuric acid can be carried out in a similar way but with an appropriate increase of the amount of esterifying agent to a stoichiometric escess, either in two steps, i.e. starting from the monoester, or in a single step.

The esterification can also be carried out with an organic acid, preferably using an anhydride or acid chloride, for example acetic anhydride, as the reagent.

The optional final reaction to give compound (I) wherein $R_2$ is a hydrogen atom, which is an improtant feature of the present invention, comprises hydrolysis to the corresponding acid and subsequent decarboxylation.

It is known from literature that reactions of this type usually take place in an acidic medium, because the carboxyl group liberated by hydrolysis remains in the free form and, if it is labile enough, it can then be decarboxylated by heating at high temperatures, possibly in the presence of catalysts. If, however, alkyline medium is used, salification generally occurs, which stabilises and thus blocks the carboxyl group. However, in the case of the compounds of the present invention, both the hydrolysis and the decarboxylation generally proceed exceptionally quickly and with very high yields, especially in an alkaline medium, whereas these steps are almost impossible in an acid medium. This feature is particularly important because the sulpho groups of the esters of general formula (I) can easily be hydrolysed in an acid medium, with reformation of the corresonding dihydroxy compounds and liberation of sulphuric acid, whereas they are completely stable in an alkaline medium. The $R_2$ group can thus be easily split off selectively by boiling for a brief period with dilute alkali, for example with 3% aqueous sodium hydroxide solution. Another reagent for this step is potassium tert-butylate, which completes the desired reaction after a short period of heating, without hydrolysis of the sulpho groups. These reaction conditions, especially in an aqueous medium, are, however, often enough to bring about, as a secondary reaction, the hydrolysis of the organic acyl radical $R_1$, if it is present, as in the case of the mixed esters. It is, therefore, necessary to acylate the decarboxylation product (I, $R_2 = H$) a second time, for example, with an acid anhydride, under the conditions described above.

The possibility of obtaining compounds (I) wherein $R_2$ is a COO-alkyl radical, carrying out the esterification of (VI) with sulphuric acid in an aqueous medium, by means of sulphur trioxide-organic base addition products, is even more important when these compounds are considered simply as intermediates for obtaining compounds (I) in which $R_2$ is a hydrogen atom, as final products. This second reaction can also be carried out in an aqueous medium: the esterification, hydrolysis and decarboxylation can easily be carried out in a single step without isolating the intermediate ester, with consequent practical advantages.

With regard to the pharmacological activity of the compounds of general formula (I), we have observed that they are almost completely non-toxic ($LD_{50} >$ 3000 mg/kg, per os in mice and rats), while, in almost all cases, they have a strong laxative activity after oral administration to rats.

As there are no modifications in the rate of intestinal motility of a charcoal meal in the small intestine and the transit time in the whole gastro-enteric tract is much reduced, the action evidently takes place in the large intestine. Preliminary clinical trails on some of the compounds of general formula (I) have also confirmed the good laxative activity in human therapy; in particular, the sodium salts of 4-acetoxyphenyl-4-sulphoxyphenyl-(2-pyridyl) methane (I, $R_1 = COCH_3$; $R_2 = H$) and of 4,4'-disulphoxydiphenyl-(2-pyridyl)-methane (I, $R_1 = SO_3H$, $R_2 = H$) have both shown a high activity and are also better tolerated in the gastrointestinal with a substantial absence of irritating effects and of abdominal pains.

As these compounds have been shown pharmacologically to have the slowest rate of evvacuation of all the products tested, there is clearly a correlation between the rate of action and the irritating effects. The structure of the two above-mentioned compounds suggests that the blocking of both the free phenolic groups of the compounds (VI) by esterification is an optimal feature for slowing down the rate of action and consequently for minimising the irritating secondary effects.

The following Examples are given for the purpose of illustrating the present invention:

EXAMPLE 1.

Ethyl α, α-di-(4-hydroxyphenyl)-2-pyridine-acetate.

50 g. Ethyl 2-pyridine-glyoxylate were cautiously added dropwise to a pre-cooled mixture of 100 ml. 85% sulphuric acid and 100 g. phenol, while stirring. The reaction mixture was externally cooled with water and ice to keep it at ambient temperature and to control the exothermic reaction. After stirring for 60 hours, the reaction mixture was poured into ice-water and washed with chloroform. The gum-like precipitate which separated and the aqueous phase were rendered alkaline with ammonium hydroxide and the resulting solution was treated with activated charcoal. After filtration, the solution obtained was adjusted to about pH 7 with diluted sulphuric acid to give a high yield of a crystalline precipitate of ethyl α, α-di(4-hydroxyphenyl)-2-pyridine-acetate. After crystallisation from isopropanol or ethyl acetate, the product was obtained in the form of a colourless, crystalline solid which melted, with decomposition, at 252° – 254°C.

EXAMPLE 2.

Ethyl α-(4-hydroxyphenyl)-α-(4-slphoxyphenyl)-2-pyridine-acetate.

17.5 g. ethyl α, α-di-(4-hydroxyphenyl)-2-pyridine-acetate were dissolved in 150 ml. anhydrous pyridine, the solution was cooled to about 0°C. and 6.4 g. chlorosulphonic acid were added dropwise within the course of about 20 minutes while stirring. The reaction mixture was left to stand at ambient temperature overnight, whereafter a slight excess of a pre-cooled 10% aqueous solution of sodium hydroxide was added. The alkaline solution was washed with chloroform and the pH then adjusted to 7.5 with 10% sulphuric acid. Any precipitate traces of unreacted material was removed by filtration and the filtrate was concentrated to dryness at reduced temperature and under reduced pressure. The solid residue was extracted with boiling ethanol and the insoluble fraction of mineral salts was discarded. The ethanolic solution was decolorised with charcoal and concentrated to dryness under vacuum and the residue was crystallised from isopropanol, filtering off any insoluble material. There was thus obtained a high yield of ethyl α-(4-hydroxyphenyl)-α-(4-sulphoxyphenyl)-2-pyridine-acetate in the form of its monosodium salt. The product was a colourless, crystalline powder which decomposed at about 140°C.

EXAMPLE 3.

9.6 g. sulphur trioxide-pyridine solid addition compound (molar ratio 1:1) was added portionwise to a solution of 17.5 g. ethyl α, α-di-(4-hydroxyphenyl)-2-pyridine-acetate in 150 ml. pyridine, kept at ambient temperature. The reaction mixture was then stirred for 4 hours at 45°C. and for 12 hours at ambient temperature. The solution was concentrated by distillation at a reduced pressure and reduced temperature and the residue was treated with a pre-cooled 10% aqueous sodium hydroxide solution to give an alkaline solution. The pH of the solution was adjusted to 7.5 with dilute sulphuric acid and then further worked up as in Example 2 to give the desired ethyl α-(4-hydroxyphenyl)-α-(4-sulphoxyphenyl)-2-pyridineacetate sodium salt.

EXAMPLE 4.

Ethyl α-(4-acetoxyphenyl)-α-(4-sulphoxyphenyl)-2-pyridine-acetate.

15 g. of the above-described ethyl α-(4-hydroxyphenyl)-α-(4-sulphoxyphenyl)-2-pyridine-acetate sodium salt were treated with 75 ml. acetic anhydride and 15 g. anhydrous sodium acetate for 18 hours at ambient temperature and then heated and stirred for 1 hour. The reaction mixture was filtered and the solution treated with excess diethyl ether to give an abundant precipitate. The product was filtered off and purified with ethanol-ether to give the desired ethyl α-(4-acetoxyphenyl)α-(4-sulphoxyphenyl)-2-pyridine-acetate sodium salt in the form of colourless crystals.

EXAMPLE 5.

Ethyl α, ,α-di-(4-sulphoxyphenyl)-2-pyridine-acetate.

35 g. chlorosulphonic acid were cautiously added dropwise to a solution of 35 g. ethyl α, α-di-(4-hydroxyphenyl)-2-pyridine-acetate in 200 ml. anhydrous pyridine cooled to about 0°C. After stirring at ambient temperature for 48 hours, the reaction mixture was poured into 250 ml. 10% aqueous sodium hydroxide solution cooled to about 0°C. and the alkaline solution was washed with chloroform. The pH was then adjusted to 7.5 with diluted sulphuric acid and concentrated to dryness under a vacuum and at about 30°C. The solid residue was extracted with boiling ethanol and the insoluble fraction was discarded. The ethanol extract was decolorised with charcoal and concentrated under reduced pressure until it started to crystallise. After having been left to stand in a refrigerator, an abundant precipitate was obtained which could, if necessary, be recrystallised from ethanol. The ehtyl α, α-di-(4-sulphoxyphenyl)-2-pyridine acetate disodium salt thus obtained, which decomposed at temperatures over 225°C., was a colourless, crystalline solid.

EXAMPLE 6.

Ethyl α-(4-hydroxyphenyl)-α-(4-sulphoxyphenyl)-2-pyridine-acetate sodium salt was treated in pyridine solution with an excess of chlorosulphonic acid (1.5 mole), according to the procedure described in Example 5, to give ethyl α, α-di-(4-sulphoxyphenyl)-2-pyridine acetate disodium salt.

EXAMPLE 7

To a solution of 7 g. ethyl α, α-(4-hydroxyphenyl)-2-pyridine acetate in 60 ml. pyridine was added portionwise, at ambient temperature and while stirring, 12.8 g. sulphur trioxide-pyridine addition compound (molar ratio 1:1). The reaction mixture was kept for 6 hours, while stirring, at 45°C., then at ambient temperature for 24 hours. The reaction mixture was treated, while cooling, with sodium hydroxide and then further worked up as in Example 5 to give the desired ethyl α, α-di-(4-sulphoxyphenyl)-2-pyridine-acetate disodium salt.

EXAMPLE 8.

The reaction of ethyl α, α-di-(4-hydroxyphenyl)-2pyridine-acetate in pyridine with sulphur trioxide-dioxan addition compound according to the procedure described in Example 7 also gave the disodium salt of the corresponding disulpho ester.

EXAMPLE 9.

10 g. ethyl α, α-di-(4-hydroxyphenyl)-2-pyridine-acetate were dissolved in the minimum quantity of 4% aqueous sodium hydroxide solution (about 80 ml.), then heated to 30° – 35°C. and 30 g. sulphur trioxide-pyridine addition compound (molar ratio 1:1) added portionwise, while stirring, over the course of 2 hours. During the first phase of the addition, there is a decrease of the pH and a resultant commencement of precipitation of unreacted material. Therefore, further quantities of diluted aqueous sodium hydroxide solution were added to maintain the reaction mixture in amost total solution, i.e. at pH 9 – 9.5 The reaction was then left to stand overnight at ambient temperature, while stirring, and the pH then adjusted to 7.5 to give an almost complete solution. Any traces of suspended material were filtered off and the filtrate was then decolorised with charcoal and evaporated to dryness under reduced pressure and at 30° – 35°C. The solid residue was extracted with boiling ethanol and the insoluble material, consisting of inorganic salts, was discarded. After decolorisation and concentration under a vacuum, the desired ethyl α, α-di-(4-sulphoxyphenyl)-2-pyridine-acetate disodium salt was precipitated from the ethanolic solution.

EXAMPLE 10.

4-hydroxyphenyl-4-sulphoxyphenyl-(2-pyridyl)-methane 20 g. ethyl α-(4-hydroxyphenyl)-α-(4-sulphoxyphenyl)-2-pyridine-acetate monosodium salt were dissolved in 200 ml. 3% aqueous sodium hydroxide solution and the solution then boiled for 1 hour. After cooling, the pH was adjusted to 7.5 by adding diluted sulphuric acid and then distilled to dryness. The residue was treated with boiling ethanol and insoluble material was filtered off. The ethanol extract was concentrated to a small volume to give, by crystallisation, a high yield of the desired 4-hydroxyphenyl-4-sulphoxyphenyl-(2-pyridyl-methane monosodium salt in the form of colourless crystals which melted at 197° – 199°C. (decomposition).

EXAMPLE 11.

4.5 g. Ethyl α-(4-hydroxyphenyl)-α-(4-sulphoxyhenyl)-2-pyridine-acetate sodium salt were treated with a solution of 3.4 g. potassium tert.-butylate in 15 ml. dimethyl sulphoxide. The reaction mixture was left for 1 hour on a boiling water-bath, then cooled and diluted with water and the pH adjusted to 7.5 with dilute sulphuric acid. The resulting solutionn was washed with chloroform and concentrated to dryness under a vaccum. After extraction with solvents and possible subsequent recrystallisation, there was thus obtained 4-hydroxyphenyl-4-sulphoxyphenyl-(2-pyridyl)-methane sodium salt.

EXAMPLE 12.

Ethyl α, α-di-(4-hydroxyphenyl)-2-pyridine-acetate was reacted with chlorosulphonic acid or with sulphur trioxide-pyridine addition compound to give the corresponding monosulpho ester. The pyridine solution obtained, for example, by the procedure described in Example 2, was, after an appropriate reaction time, poured into an excess of 10% aqueous sodium hydroxide solution, washed with chloroform and then boiled for 1 hour, without isolating the intermediate from the solution, thus proceeding directly to the hydrolysis and decarboxylation. After cooling, the pH was adjusted to 7.5 and the solution was concentrated to dryness and then worked up as in Example 10 to isolate the desired 4-hydroxyphenyl-4-sulphoxyphenyl-(2-pyridyl)-methane sodium salt.

EXAMPLE 13.

4-Acetoxyphenyl-4-sulphoxyphenyl-(2-pyridyl)-methane 100 g. 4-hydroxyphenyl-4-sulphoxyphenyl-(2-pyridyl)-methane sodium salt were treated with 400 ml. acetic anhydride and 100 g. anhydrous sodium acetate under conditions similar to those described in Example 4. The reaction mixture was filtered and the filtrate was concentrated at a reduced temperature and under reduced pressure. By subsequently adding excess diethyl ether, there was obtained a crystalline solid which was further purified with appropriate mixtures of ethanol and diethyl ether. A high yield of pure 4-acetoxyphenyl-4-sulphoxyphenyl-(2pyridyl)-methane sodium salt was thus obtained in the form of colourless crystals which melted at 142° – 143°C.

EXAMPLE 14.

4,4'-Disulphoxydiphenyl-(2-pyridyl)-methane 50 g. Ethyl α, α-di-(4-sulphoxyphenyl)-2-pyridine-acetate disodium salt were dissolved in 500 ml. 3% sodium hydroxide solution and boiled for 1 hour. The solution ws cooled and the pH adjusted to 7.5. After evaporating to dryness under a vacuum, the process of Example 10 was followed. The solid residue was extracted with boiling ethanol and the insoluble material was discarded. The ethanol extract was concentrated under reduced pressure and at a reduced temperature until crystallisation commenced. After leaving to stand, while cooling, an abundant precipitate was obtained of 4,4'-disulphoxydiphenyl-(2-pyridyl)methane disodium salt in the form of a colourless, crystalline substance with a melting point of 273° – 275°C. (decomposition).

EXAMPLE 15.

A solution of 5.5 g. ethyl α, α-di-(4-sulphoxyphenyl)-2-pyridine-acetate disodium salt in dimethyl sulphoxide was treated with 3.4 g. potassium tert.-butylate according to the procedure described in Example 11. After heating for 1 hour on a boiling water-bath, diluting with water and adjusing the pH to 7.5, it was thoroughly washed with chloroform and then concentrated to dryness under a vacuum: By subsequent extraction and crystallisation with ethanol, there was obtained the desired 4,4'-disulphoxy-diphenyl-(2-pyridyl)-methane disodium salt.

EXAMPLE 16.

Ethyl α, α-di-(4-hydroxyphenyl)-2-pyridine-acetate was reacted with chlorosulphonic acid in pyridine according to the procedure of Example 5 to give the corresponding disulpho ester. The reaction mixture was then poured into excess 10% aqueous sodium hydroxide solution, washed with chloroform and then boiled directly for 1 hour, without isolating the intermediate product. After selective hydrolysis of the carbethoxy group, the pH was adjusted to 7.5, followed by working up as described in Example 14 to give 4,4'-disulphoxy-diphenyl-(2-pyridyl)-methane disodium salt.

EXAMPLE 17.

Ethyl α, α-di-(4-hydroxyphenyl)-2-pyridine-acetate was dissolved in a dilute aqueous solution of sodium hydroxide and treated with an excess of sulphur trioxidepyridine addition compound, following exactly the procedure described in Example 9. At the end of the reaction, the pH of the aqueous solution containing ethyl α, α-di-(4-sulphoxyphenyl)-2-pyridine-acetate was adjusted to about 11 with 10% aqueous sodium hydroxide solution and kept at the boil for 1 hour to hydrolyse the carbethoxy group and bring about decarboxylation. The pH was then adjusted to about 7.5 by adding dilute sulphuric acid and the solution was washed with chloroform and evaporated to dryness under a vacuum. After extraction of the residue with boiling ethanol, the alcohol extract was concentrated under reduced pressure and left to crystallise, while cooling, to give the desired 4,4'-disulphoxydiphenyl-(2-pyridyl)-methane disodium salt.

The novel compositions of the present invention contain at least one active compound (I), together with a pharmaceutically-acceptable carrier. The term "pharmaceutically-acceptable" as used herein in reference to the compositions of the present invention means a solid or liquid composed of a single substance or a number of substances which may be solids, liquids or a combination of solids and liquids. The concentration of active ingredient in the composition is not critical but, for economy of preparation, should be at least 0.3% by weight and is preferably 0.5 – 2.0% by weight. These compositions can be administered either orally, rectally or parenterally to human subjects and are generally administered in an amount sufficient to give 25 to 250 mg. of active substance per day. For oral administration, there can be used any conventional type of tablets, lozenges, capsules, dragees, pills and powders; for parenteral administration, aqueous and non-aqueous solutions or suspensions are appropriate and for rectal administration there can be used any conventional type of suppository base, such as glycerol, cocoa butter and the like. The new compounds can also be used in solutions which are appropriate for rectal instillation. Acceptable pharmaceutical carriers include gelatine capsules, sugars, such as lactose or sucrose, starches, such as corn starch or potato starch, cellulose derivatives, such as sodium carboxymethyl cellulose, ethyl cellulose, methyl cellulose or cellulose acetate phthalate, gelatin, talc, calcium phosphates, such as dicalcium phosphate or tricalcium phosphate, sodium sulphate, calcium sulphate, polyvinyl pyrrolidone, acacia, polyvinyl alcohol, stearic acid, alkaline earth metal stearates, such as magnesium stearate, vegetable oils, such as groundnut oil, cottonseed oil, sesame oil, olive oil, corn oil and oil of therobroma, water, agar, alginic acid, benzyl alcohol, isotonic saline and phosphate buffer solutions, as well as other non-toxic, compatible substances used in pharmaceutical formulations.

The following Example illustrates a pharmaceutical composition according to the present invention:

EXAMPLE 18.

250 mg. tablets are prepared containing:

| | |
|---|---|
| ethyl α-(4-hydroxyphenyl)-α-(4-sulphoxyphenyl)-2-pyridine-acetate | 25 mg. |
| starch | 150 mg. |
| lactose | 70 mg. |
| magnesium stearate | 5 mg. |

The composition described in Example 18 is intended for oral administration to humans for the relief of constipation.

We claim:

1. A process for the preparation of an ester of the formula (I)

in which $R_1$ is a hydrogen atom or a suphoxy group or is alkanoyl having up to 6 carbon atoms and Me is a pharmaceutically acceptable inorganic or organic non-toxic cation, wherein a compound of the formula (II)

in which Me and $R_1$ have the same meaning as above, is selectively hydrolyzed and then decarboxylated, in a basic medium to produce the objective compound I wherein $R_1$ is hydrogen or a sulphoxy group and, when desired, acylating said compound with an organic acid to produce a compound I wherein $R_1$ is alkanoyl having up to 6 carbon atoms.

2. A process according to claim 1 wherein $R_1$ is alkanoyl having up to 6 carbon atoms having up to 6 carbons.

3. A process according to claim 1 wherein the hydrolysis and decarboxylation takes place in an aqueous basic medium.

4. A process according to claim 1 wherein the compound II is subjected to a selective hydrolysis and decarboxylation reaction in a boiling dilute aqueous sodium hydroxide solution for a period of 1 hour.

5. A process according to claim 4 wherein the dilute aqueous solution hydroxide solution contains 3% of sodium hydroxide therein.

6. A process according to claim 1 wherein the compound II is subjected to a selective hydrolysis and decarboxylation reaction in a solution of potassium tert.-butylate in dimethylsulphoxide at 100°C for a period of 1 hour.

* * * * *